(12) United States Patent
Wang

(10) Patent No.: US 10,570,947 B1
(45) Date of Patent: Feb. 25, 2020

(54) FLIPPER SCREW

(71) Applicant: Ching-Wen Wang, New Taipei (TW)

(72) Inventor: Ching-Wen Wang, New Taipei (TW)

( * ) Notice: Subject to any disclaimer, the term of this patent is extended or adjusted under 35 U.S.C. 154(b) by 0 days.

(21) Appl. No.: 16/191,882

(22) Filed: Nov. 15, 2018

(51) Int. Cl.
    *F16B 35/06* (2006.01)
    *F16B 39/282* (2006.01)
    *A63B 31/11* (2006.01)

(52) U.S. Cl.
    CPC ............ *F16B 39/282* (2013.01); *A63B 31/11* (2013.01); *F16B 35/06* (2013.01); *A63B 2031/112* (2013.01)

(58) Field of Classification Search
    CPC ........ F16B 39/282; F16B 35/06; A63B 31/11; A63B 2031/112
    See application file for complete search history.

(56) References Cited

U.S. PATENT DOCUMENTS

| | | | | |
|---|---|---|---|---|
| 4,773,885 A * | 9/1988 | Ciccotelli | ............. | A63B 31/11 441/64 |
| 5,041,039 A * | 8/1991 | Chang | .................... | A63B 31/11 36/8.1 |
| 5,324,219 A * | 6/1994 | Beltrani | ................. | A63B 31/11 441/64 |
| 5,447,457 A * | 9/1995 | Kamitani | ............... | A63B 31/11 441/64 |
| 5,527,197 A * | 6/1996 | Evans | .................... | A63B 31/11 441/64 |
| 6,129,601 A * | 10/2000 | Aucoin | .................. | A63B 31/11 441/64 |
| 8,376,796 B1 * | 2/2013 | Vock | ...................... | A63B 31/11 441/64 |
| 9,283,436 B2 * | 3/2016 | Donahue | ................ | A63B 31/11 |
| 9,943,727 B2 * | 4/2018 | Giovannotto | ......... | A63B 31/11 |
| 2013/0090028 A1 * | 4/2013 | Mayer | .................... | A63B 31/11 441/64 |
| 2017/0113098 A1 * | 4/2017 | Giovannotto | ......... | A63B 31/11 |
| 2018/0133555 A1 * | 5/2018 | Ortwig | .................... | A43B 5/08 |
| 2019/0059505 A1 * | 2/2019 | Ohlin | ..................... | A63B 31/11 |

* cited by examiner

*Primary Examiner* — S. Joseph Morano
*Assistant Examiner* — Jovon E Hayes
(74) *Attorney, Agent, or Firm* — Egbert Law Offices, PLLC

(57) ABSTRACT

A flipper screw includes a lower cover with a screw and a lower cover with nut, and it is used for fixing the web by replacing the anti-slip screw. The upper cover and the lower cover are provided with plural snap portion, which can be snapped in the rib around the screw hole, so as to avoid the web accidentally being released from the flipper.

7 Claims, 4 Drawing Sheets

FLIPPER SCREW

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable

REFERENCE TO AN APPENDIX SUBMITTED ON COMPACT DISC

Not applicable.

BACKGROUND OF THE INVENTION

1. Field of the Invention

The present invention relates to a flipper screw, and more particularly to a flipper screw in which a non-slip screw can be replaced by an upper and lower cover with a snap portion, and which the webs can be replaced without using a tool.

2. Description of Related Art Including Information Disclosed Under 37 CFR 1.97 and 37 CFR 1.98

In modern society, there are an increasing number of recreational people engaged in underwater activities. In order to facilitate underwater activities, people will wear flippers with webs, but the webs of the flippers are consumables. It is known that there are the flippers with webs that can be replaced, but the conventional fixed structure of the webs adopts non-slip screws. When replacing the webs, tools are needed and the webs cannot be replaced by hand.

In view of this, the inventor has invented a flipper screw to improve the above prior art.

BRIEF SUMMARY OF THE INVENTION

The present invention mainly aims to provide a flipper screw, which replaces the anti-slip screw by an upper and lower cover with a snap portion, and is snapped in the rib of the adjacent screw hole without sliding.

In order to clearly and fully disclose the device of the present invention, a preferred embodiment of the present invention will be described in detail below.

DETAILED DESCRIPTION OF THE INVENTION

Figure 1:
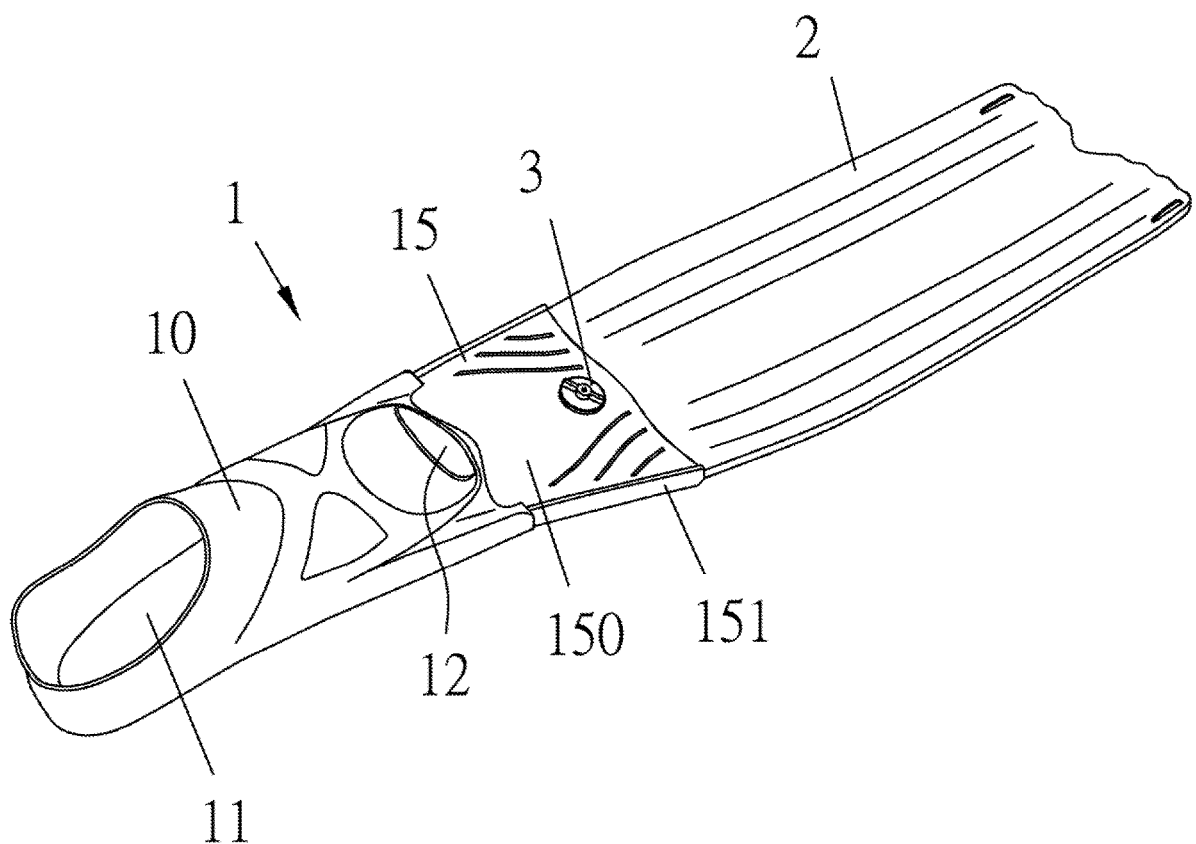
FIG. 1 is a three-dimensional diagram of the present invention.
Figure 2:
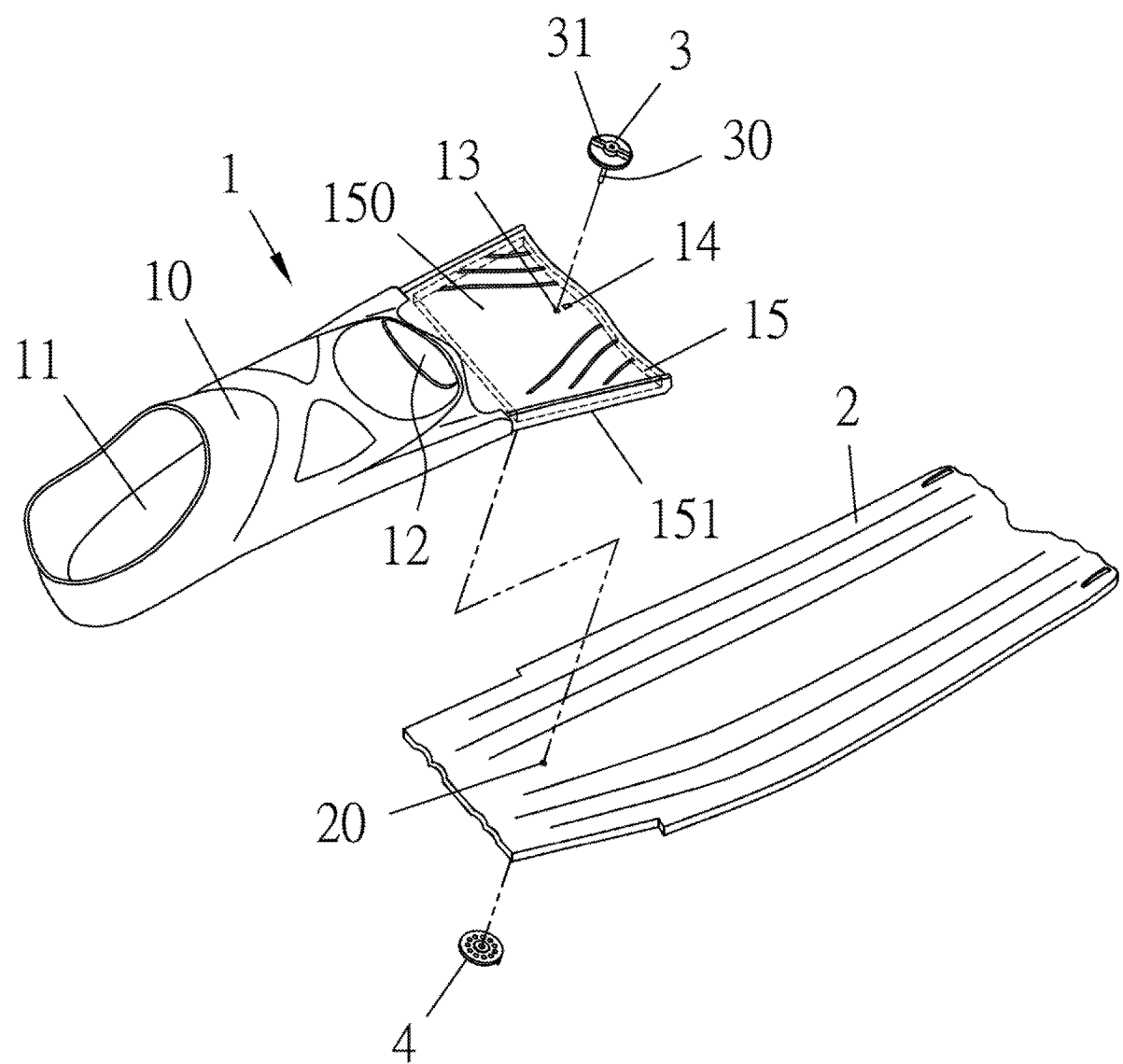
FIG. 2 is an exploding diagram of FIG. 1.

Referring to FIG. 1-FIG. 4, a schematic diagram of an embodiment of the present invention, the flipper of the present invention is illustrated by the above diagrams, comprising a foot sleeve 1, a web 2, an upper cover 3 and a lower cover 4. The foot sleeve 1 has a body, a socket 15, a plural first through-hole 13 and a first snap portion 14; the body has a surrounding portion 10 and a bottom 11 to jointly define a foot containing space; a hollow hole 12 is arranged in front of the surrounding portion 10. The front end of the bottom 11 is connected with the socket 15. The socket 15 has two opposite horizontal walls 150 and two opposite vertical walls 151 to jointly define a cavity. Each first through-hole 13 is disposed in each horizontal wall 150. The cavity can be inserted into a web 2, and the web 2 is provided with one second through-hole 20 at least, the second through-hole 20 is aligned with each first through-hole 13 when the web 2 is inserted into the cavity. The first snap portion 14 is adjacent to each first through-hole 13 by a first distance, and the length of the first snap portion 14 in the diameter direction of the first through-hole 13 is a first length, and the length of the first snap portion 14 in the tangential direction of through-hole 13 is a second length.

The upper cover 3 is provided with a first contact surface 35 and an opposite first operating surface 34. The center of the upper cover 3 is provided with a threaded screw body 30. The screw body 30 is perpendicular to the first contact surface 35, and the first contact surface 35 is a surface for an upper cover 3 contacted with socket 15. The first contact surface 35 is provided with plural second portions 32 around the screw body 30. There is a first interval 33 between second snap portions 32, and there is a second distance between second snap portion 32 and screw body 30.

The lower cover is provided with a second contact surface 45 and an opposite second operating surface 44. The lower cover 4 is provided with a threaded screw hole 40 therein, and the second contact surface 45 is a surface for a lower cover 4 contacted with the socket 15, and the second contact surface 45 is provided with plural third portions 42 around the screw hole 40. There is a second interval 43 between plural third portions 42. There is a third distance between third portion 42 and screw hole 40. The first distance, second distance and third distance are approximately equal, so the first snap portion 14 can snap the second snap portion 32 and the third snap portion 42.

The screw body 30 is coupled to the screw hole 40 after passing through the first through-hole 13 and the second through-hole 20. Each second snap portion 32 is snapped with the first snap portion 14, and each third snap portion 42 is snapped with the first snap portion 14. The web2 is fixe in the socket 15 by the upper cover 3 and the lower cover 4. The first snap portion 14, each second snap portion 32 and each third snap portion 42 prevent the screw body slid off from the screw hole.

Figure 3:
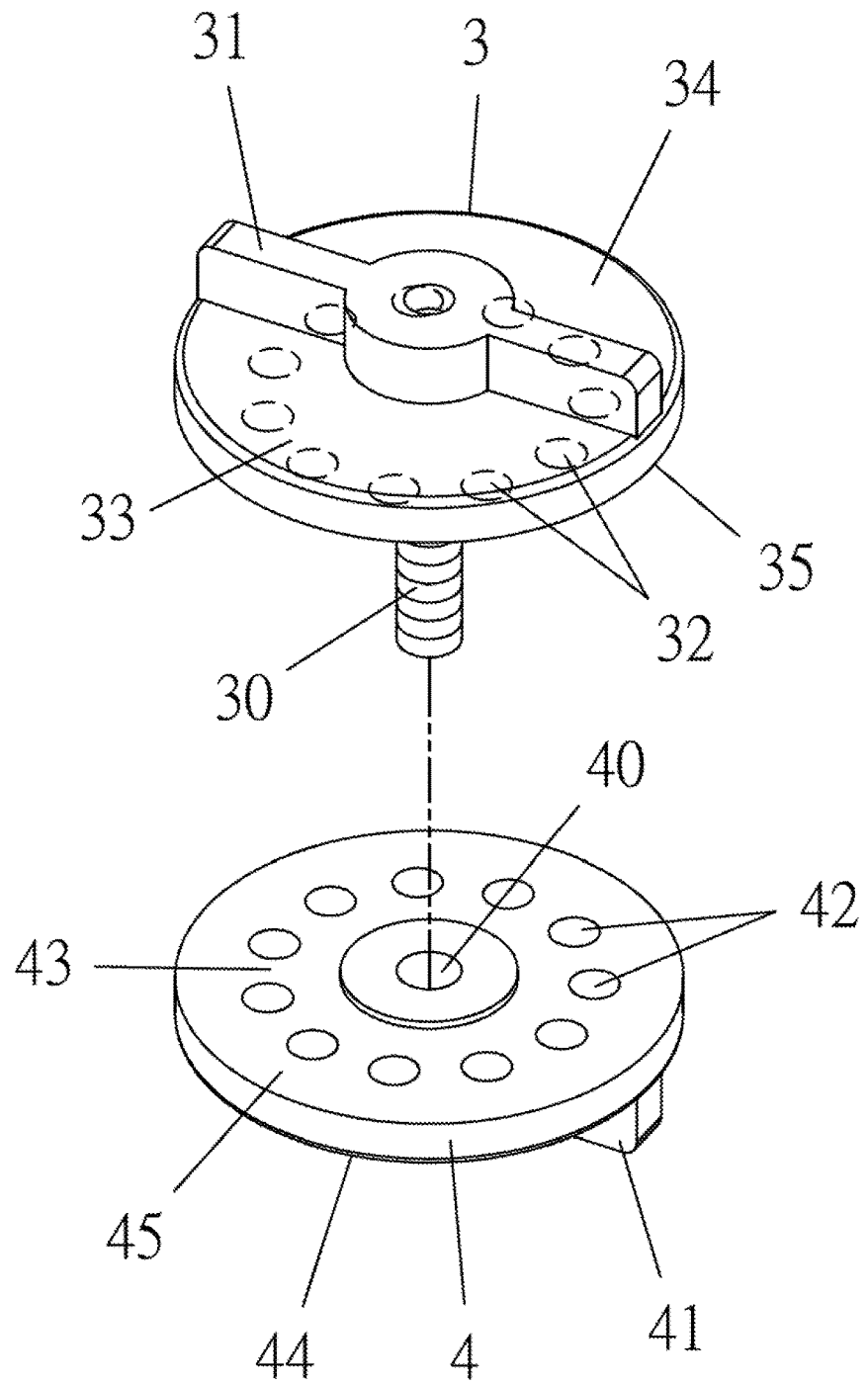
FIG. 3 is a three-dimensional diagram of top and bottom cover of the present invention.

In FIG. 3, it can be seen that the upper cover 3 is provide with a first operating portion 31, and the lower cover 4 is provide with a second operating portion 41. The first operating portion 31 is approximately perpendicular to the first operating surface 34, and the second operating portion 41 is approximately perpendicular to the second operating surface 44. The user can rotate the upper cover 3 and the lower cover 4 by the first operating portion 34 and the second operating portion 44.

Figure 4:
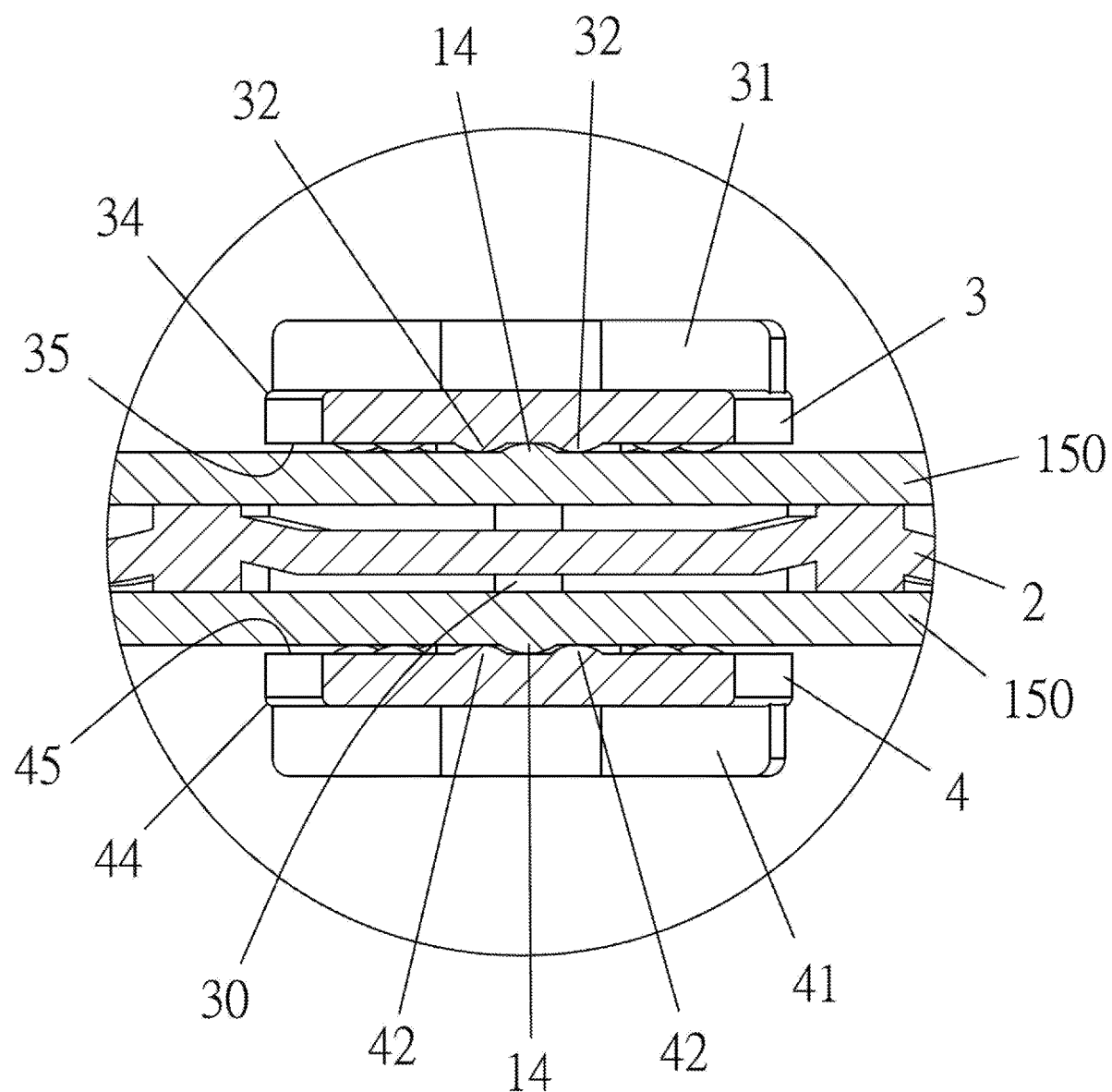
FIG. 4 is a longitudinal diagram of the through-hole in the fixed state of the present invention.

In FIG. 4, the upper cover 3 and the lower cover 4 are combined, the second snap portion 34 is snapped with the first snap portion 14, and the third snap portion 42 is snapped with the first snap portion 14, so that the upper cover 3 and the lower cover 4 are not easily released due to external force, but the user can decompose the upper cover 3 and the lower cover 4 by the force application point obtained from the first operation unit 34 and the second operation unit 44.

Although the present invention has been described in terms of specific exemplary embodiments and examples, it will be appreciated that the embodiments disclosed herein are for illustrative purposes only and various modifications and alterations might be made by those skilled in the art without departing from the spirit and scope of the invention as set forth in the following claims.

I claim:

1. A flipper screw comprising:
   a foot sleeve having a body, a socket, a plurality of first through-holes and a first snap portion, the body having a surrounding portion and a bottom that jointly define a foot containing space, a front side of the surrounding portion having a hollow hole, a front end of the bottom being connected to the socket, the socket having a cavity defined by a pair of horizontal walls and a pair of opposite vertical walls, each of the plurality of first through-holes being disposed in each horizontal wall of the pair of horizontal walls, the cavity having a web inserted therein, the web having a second through-hole, the second through-hole being aligned with each of the plurality of first through-holes when the web is inserted into the cavity, a distance between the first snap portion and the first through-hole being a first distance, a length of the snap portion in a diameter direction of the first through-hole is a first length, and a length of the first snap portion in a tangential direction of the first through-hole is a second length;
   an upper cover having a first contact surface and an opposite first operating surface, said upper cover having a threaded screw body perpendicular to the first contact surface, the first contact surface contacting the socket, the first contact surface having a plurality of second snap portions around the threaded screw body, the plurality of second snap portions having a first interval therebetween, a distance between each of the plurality of second snap portion and the threaded screw body being a second distance; and
   a lower cover having a second contact surface and an opposite second operating surface, the lower cover having a threaded screw hole, the second contact surface being a surface of said lower cover contacting the socket, the second contact surface having a plurality of third snap portions around the threaded screw hole, each of the plurality of third snap portions having a second interval therebetween, a distance between the plurality of third snap portions and the threaded screw body is a third distance.

2. The flipper screw of claim 1, wherein the first interval is greater than the second length.

3. The flipper screw of claim 1, wherein the second interval is greater than the second length.

4. The flipper screw of claim 1, wherein the first distance is approximately equal to the second distance.

5. The flipper screw of claim 1, wherein the first distance is approximately equal to the third distance.

6. The flipper screw of claim 1, wherein the first operating surface has at least one first operating portion.

7. The flipper screw of claim 1, wherein the second operating surface has at least one second operating portion.

\* \* \* \* \*